Sept. 13, 1949.                  C. T. ROGERS                    2,481,685
                        AUTOMOBILE OR LIKE TOWING DEVICE
                              Filed Dec. 6, 1946
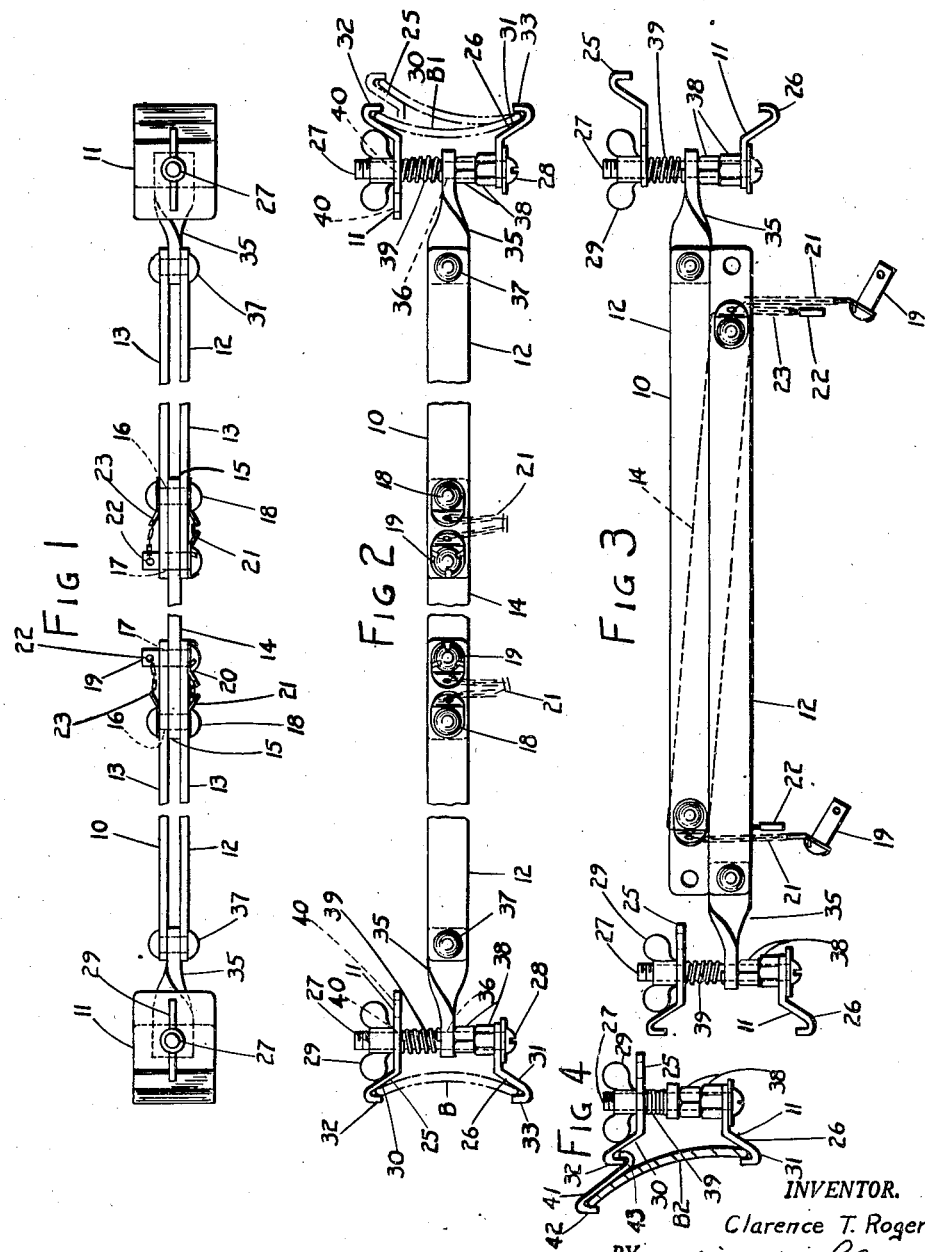
INVENTOR.
Clarence T. Rogers
BY William Cleland
Attorney Patented Sept. 13, 1949

2,481,685

UNITED STATES PATENT OFFICE 2,481,685

AUTOMOBILE OR LIKE TOWING DEVICE

Clarence T. Rogers, Akron, Ohio

Application December 6, 1946, Serial No. 714,556

7 Claims. (Cl. 280—33.14)

This invention relates to an automobile or like towing device of the draw bar type.

One object of the present invention is to provide an improved towing device which may be quickly attached between the bumpers of two automobiles, for example, and which includes improved means whereby it may be quickly collapsed to a small, compact size, as for storage in an automobile when not in use.

Another object of the invention is to provide a towing device of the character described, including an improved universal clamping device adapted to be quickly and easily attached to bumpers within a wide range of sizes and shapes.

These and other objects of the invention will be manifest from the following brief description and the accompanying drawings.

Of the accompanying drawings:

Figure 1 is a top plan view, partly broken away, of a vehicle towing device embodying the features of the invention.

Figure 2 is a front elevational view thereof, on the same scale, and partly broken away.

Figure 3 is a front elevational view corresponding to Figure 2, but illustrating the towing bar in collapsed condition.

Figure 4 is a fragmentary detail view, illustrating one of the bumper clamping attachments in use with an adaptor to accommodate a wide, sloping automobile bumper.

Referring particularly to Figures 1 and 2, the numeral 10 designates a rigid tow bar, having at the extreme ends thereof quickly adjustable clamping means 11, 11 for attaching the bar to opposed automobile or other vehicle bumpers of known types.

The tow bar 10 includes opposite end sections 12, 12, which may be laterally spaced strips 13, 13 of flat bar stock extending longitudinally in parallelism, and an intermediate section 14, which may be a single strip of similar flat bar stock having the opposite ends thereof received as spacers between spaced bars 13, the ends of the respective sections being in substantially overlapping relation, as indicated at 15, 15. Provided through the ends of the strips 13 and 14, constituting each overlapping portion 15, may be aligned apertures in longitudinally spaced relation, as indicated at 16 and 17. A pivot pin 18 extending through aperture 16 has heads at opposite outer ends thereof to prevent its removal from the tow bar, and a pin 19 removably received through aperture 17 has a head 20 at one end to engage one side of the bar, the other end thereof extending freely from the other side of the bar.

Chain or like flexible means 21 may be provided between one head of each pin 18 and the head 20 of the removable pin 19 associated therewith, to prevent loss or misplacement of the latter. As a safety measure, removal of the pin 19 from the aperture 17 may be prevented by means of a pin 22 received through an aperture in said free end of pin 19, and loss or misplacement of pin 22 similarly may be prevented by attachment thereof to the pin 18 by a chain 23 similar to chain 21.

The above-described arrangement is such that the pins 18 and 19 will maintain the end sections 12, 12 and the intermediate section 14 in rigid longitudinally extended position, but when it is desired to collapse the tow bar for purposes to be described later, the two pins 19 may be removed, after removal of locking pins 22 therefrom, to permit the three sections of the tow bar to be folded upon themselves in zig-zag relation about the pivot pins 18, to a very small compact size approximating the length of one of the sections, substantially shown in Figure 3. The extreme compactness shown is made possible by the fact that the angularly extending intermediate section 14 is completely absorbed between the laterally spaced strips of the coextending sections 12, 12.

Again referring particularly to Figures 1 and 2, each clamping device 11 includes a pair of jaws 25 and 26 provided with alignable apertures, through which is received a bolt 27, the jaws being engaged between a head 28 on one end of the bolt and a thumb-nut 29 threaded on the other end thereof. The opposed jaws 25 and 26 may be formed of flat bar stock to have oppositely outwardly diverging portions 30 and 31, respectively, terminating in oppositely inturned portions 32 and 33, adapted by adjustment of thumb-nut 29 clampingly to engage over opposite upper and lower edge portions of front or rear vehicle bumpers B and B1, as indicated in chain-dotted lines in Figure 2. To provide for substantial variations in the sizes and shapes of automobile bumpers, the upper jaw 25 may have one or more bolt-receiving apertures, as indicated at 40, 40, to permit adjustment of said upper jaw longitudinally outwardly of bolt 27 to engage the top of a bumper having a substantial inclination (see chain-dotted lines at extreme right of Figure 2).

Intermediate the jaws 25 and 26 may be a link 35 of flat bar stock having an aperture 36 at one end through which the bolt 27 is received, whereby the link is swingable in a horizontal plane relatively of the bolt, the link being twisted to have the other end thereof extending in a vertical plane to be received as a spacer between the end portions of said spaced strips 13, and a pin or rivet 37 being provided through aligned apertures through said strips and the link, whereby the link is relatively swingable in a vertical plane on said pin 37. The link 35 may be yieldingly urged toward a centered stop position between the jaws 25 and 26, as against suitable spacers 38 on the bolt 27, by a compression spring 39 engaged between upper jaw 26 and the link.

Referring particularly to Figure 4, very wide bumpers which slope at a relatively great angle may be accommodated by use of an adaptor 41, which may be a flat strip of bar stock terminating in reversely inturned or hook-shaped portions 42 and 43, somewhat in the form of an S. This adaptor is arranged to have one end thereof hooked under the hooked part 32 of the upper jaw, and to have the other end thereof hooked over the top edge of the bumper B2. The shape of the adaptor preferably is such that it may be substantially self-supportingly engageable on the top edge of the bumper with the lower hooked part 43 turned upwardly to take the downward clamping thrust of the upper jaw in place of the bumper itself.

In the operation or use of the above-described towing device for towing of one vehicle by another, the bar 10 may first be arranged in the extended position shown in Figures 1 and 2, with the two locking pins 19 received in the aligned apertures 17 of the overlapping end portions 15, and with the safety pins 22 in place through the free ends of pins 19. Next, through the thumb-nuts 29, the two clamping devices 11 may be quickly adjusted, as previously described to attach the opposite ends of the bar to the opposing bumper bars of the two vehicles, either as illustrated in chain-dotted lines in Figure 2, or in full lines in Figure 4. With the device thus attached one vehicle may either push or pull the other. The procedure of course, may be varied according to circumstances. For example, while the bar 10 is in collapsed condition, the clamping means 11 may both be attached to vehicle bumpers which are relatively close together, after which the vehicles may be relatively moved apart to the extended position of bar 10, which may then be locked in such an extended position as before. It will be readily seen that because of the universal joint arrangement of the two clamping devices 11, provided by the same each having angularly disposed pivotal points through the bolt 27 and pin 37, the towing device is very effective for towing even though the vehicles may be substantially out of alignment.

Conversely, the towing device is very easily detached from the bumpers B and B1, by loosening the thumb-nuts 29, after which the pins 19 may be removed as previously described to permit folding the bar to compact size, as shown in Figure 3. In this folded condition of the towing device, it is possible to store the same in a very small space, as for example, a space of about 26" x 4" x 2½". The size of the device, of course, is variable according to circumstances or requirements.

Modifications of the invention may be resorted to without departing from the spirit thereof or the scope of the appended claims.

What is claimed is:

1. A towing device of the character described, comprising a bar including a plurality of rigid, elongated sections having adjacent ends connected in overlapping relation in a longitudinally extended position of the bar, spaced pins extended through each said overlapping connection for rigidly retaining the sections in said extended position thereof, one of said spaced pins constituting a pivot between adjacent sections of each and the other pin being removable, whereby upon removal of said removable pin the bar is collapsible to compact length approximating the length of one of the segments thereof, elements pivoted to the extreme outer ends of said bar to be swingable substantially in a vertical plane, and adjustable clamping means pivoted on each said element to be swingable in a horizontal plane, said clamping means including movable jaws adjustable to grip opposite portions of a vehicle bumper or like structure.

2. A towing device of the character described, comprising a bar including a plurality of rigid, elongated sections having adjacent ends connected in overlapping relation in a longitudinally extended position of the bar, spaced pins extended through each said overlapping connection for rigidly retaining the sections in said extended position thereof, one of said spaced pins constituting a pivot between adjacent sections of each and the other pin being removable, whereby upon removal of said removable pin the bar is collapsible to compact length approximating the length of one of the sections thereof, elements pivoted to the extreme outer ends of said bar to be swingable in one plane, and adjustable clamping means pivoted on each said element to be swingable in a plane at an angle to said other plane.

3. A towing device of the character described, comprising a rigid, elongated bar, elements pivoted to the extreme outer ends of said bar to be swingable in one plane, and adjustable clamping means pivoted on each said element to be swingable in a plane at an angle to said other plane, said elements having apertures in the free ends thereof, said clamping means each including a bolt extending freely through said aperture in the free end of said element, oppositely disposed jaws having apertures for reception of said bolt therethrough, said jaws being shiftable relatively of each other on the bolt, spring means for yieldingly urging said jaws apart, and a nut on said bolt for releasably clamping said jaws together against the action of said spring means, said opposing jaws thereby through said nut being adjustable to grip opposite portions of a vehicle bumper or like structure.

4. A towing device of the character described, comprising a rigid, elongated bar, elements pivoted to the extreme outer ends of said bar to be swingable in one plane, and adjustable clamping means pivoted on each said element to be swingable in a plane at an angle to said other plane, said elements having apertures in the free ends thereof, said clamping means each including a bolt extending freely through said aperture in the free end of said element, oppositely disposed jaws having a plurality of selectively alignable apertures for reception of said bolt therethrough to present the jaws in different relative relationships, said jaws being shiftable relatively of each other on the bolt, spring means for yieldingly urging said jaws apart, and a nut on said bolt for releasably clamping said jaws together against the action of said spring means, said opposing jaws thereby through said nut being adjustable to grip opposite portions of a vehicle bumper or like structure.

5. A towing device as set forth in claim 3, wherein the jaws of said clamping means have oppositely inwardly hooked portions, and including at least one separate S-shaped adaptor adapted to have one end hooked onto the hooked portion of one of said jaws and the other end hooked onto said bumper or like structure.

6. A towing device of the character described, comprising a bar including a series of rigid, elongated sections having adjacent ends pivotally connected to be in overlapping relation with the sections extended in longitudinal alignment, pins removably extended through each said overlapping connection in spaced relation to the pivot for rigidly retaining the sections in said extended position thereof, alternate sections of said bar including pairs of strips extending longitudinally in spaced parallelism and the section intermediate the alternate sections being a single strip having the ends thereof engaged between the spaced end portions of the parallel strips, said removable pins being removable whereby the bar is collapsible about said pivots in zig-zag relationship to a compact size with said alternate sections closely adjacent and coextensive lengthwise with respect to each other and with said intermediate section angularly received between the spaced bars of the alternate sections, and adjustable clamping means swivelly connected to opposite ends of said bar and being adjustable to clamp said ends to opposed structural portions of two vehicles.

7. A towing device of the character described, comprising a bar including a plurality of rigid, elongated sections having adjacent end portions pivotally connected to be in overlapping relation with the sections extended in longitudinal alignment, releasable locking means in association with each said overlapping end portion for rigidly retaining the sections in said extended position thereof, whereby upon release of said locking means the bar is collapsible in zig-zag fashion about said pivotal connections to compact length approximating the length of one of the sections thereof, elements pivoted to the extreme outer ends of said bar to be swingable in one plane, and adjustable clamping means pivoted on each said element to be swingable in a plane at an angle to said other plane.

CLARENCE T. ROGERS.

REFERENCES CITED

The following references are of record in the file of this patent:

UNITED STATES PATENTS

| Number | Name | Date |
|---|---|---|
| 1,478,041 | Lorenz | Dec. 18, 1923 |
| 1,563,860 | Jacobson | Dec. 1, 1925 |
| 2,120,422 | Williams et al. | June 14, 1938 |

FOREIGN PATENTS

| Number | Country | Date |
|---|---|---|
| 806,862 | France | Dec. 28, 1936 |